(12) United States Patent
Margolin

(10) Patent No.: US 6,177,943 B1
(45) Date of Patent: Jan. 23, 2001

(54) DIGITAL MAP COMPRESSION AND DISPLAY METHOD

(76) Inventor: Jed Margolin, 3570 Pleasant Echo Dr., San Jose, CA (US) 95148-1916

(*) Notice: Under 35 U.S.C. 154(b), the term of this patent shall be extended for 0 days.

(21) Appl. No.: 09/031,998

(22) Filed: Feb. 27, 1998

(51) Int. Cl.$^7$ .................................................. G06T 15/00
(52) U.S. Cl. .......................................................... 345/419
(58) Field of Search .................................. 345/418, 419, 345/420, 423, 424

(56) References Cited

U.S. PATENT DOCUMENTS

| 4,660,157 | | 4/1987 | Beckwith et al. . | |
|---|---|---|---|---|
| 4,884,971 | | 12/1989 | Chan et al. . | |
| 5,140,532 | | 8/1992 | Beckwith et al. . | |
| 5,179,638 | | 1/1993 | Dawson et al. . | |
| 5,299,300 | | 3/1994 | Femal et al. . | |
| 5,781,195 | * | 7/1998 | Marvin | 345/428 |
| 5,809,179 | * | 9/1998 | Marimont et al. | 382/254 |
| 5,850,226 | * | 12/1998 | Nagasawa et al. | 345/419 |
| 5,917,495 | * | 6/1999 | Doi et al. | 345/419 |
| 5,923,329 | * | 7/1999 | Beale | 345/419 |
| 5,943,057 | * | 8/1999 | Ohba | 345/419 |
| 5,945,976 | * | 8/1999 | Iwamura et al. | 345/419 |
| 5,963,209 | * | 10/1999 | Hoppe | 345/428 |
| 5,970,682 | | 11/1990 | Beckwith et al. . | |
| 5,974,423 | * | 10/1999 | Margolin | 342/423 |
| 6,020,893 | * | 2/2000 | Freeman | 345/428 |
| 6,023,278 | * | 2/2000 | Margolin | 345/419 |
| 6,057,849 | * | 5/2000 | Haubner et al. | 345/428 |

OTHER PUBLICATIONS

Description of USGS Digital Elevation Model Data, Earth Resource Observation Systems, U.S. Geological Survey, EROS Data Center, Sioux Falls, SD 57198.

Description of USGS Digital Line Graph Data, Earth Resources Observation Systems, U.S. Geological Survey, EROS Data Center, Sioux Falls, SD 57198.

Sales brochure for navigation data base in computer readable form, Jeppesen Sanderson, Inc; 55 Inverness Drive East, Englewood, CO 80112.

* cited by examiner

Primary Examiner—Cliff N. Vo

(57) ABSTRACT

A digital elevation database is compressed to create a compressed digital map database which is used by a digital computer system for displaying three-dimensional terrain data in the form of polygons. The compressed digital map database is produced from a database of elevation points by selecting every mth row and every nth column, thereby resulting in a reduction of database storage requirements. During program run-time the intersection of rows and columns forms cells with four corners. The elevation value of a center elevation point for each cell is formed by various methods, thereby creating a cell made up of four three-dimensional triangles. One method for creating the elevation of the center elevation point uses the elevations of the four corners of the cell. Another method uses extrapolated elevation values from the cell's extended diagonals. The three-dimensional triangles formed from the center elevation point are then transformed and projected using standard computer graphics methods on a digital computer to produce a three-dimensional projected display.

16 Claims, 19 Drawing Sheets

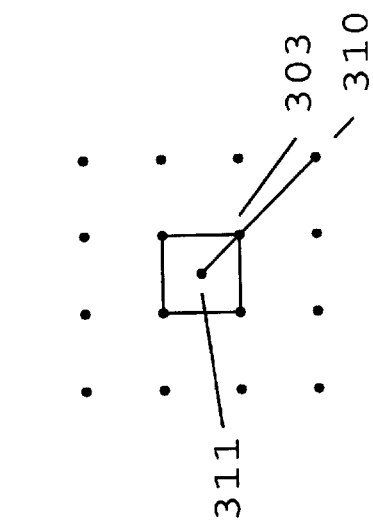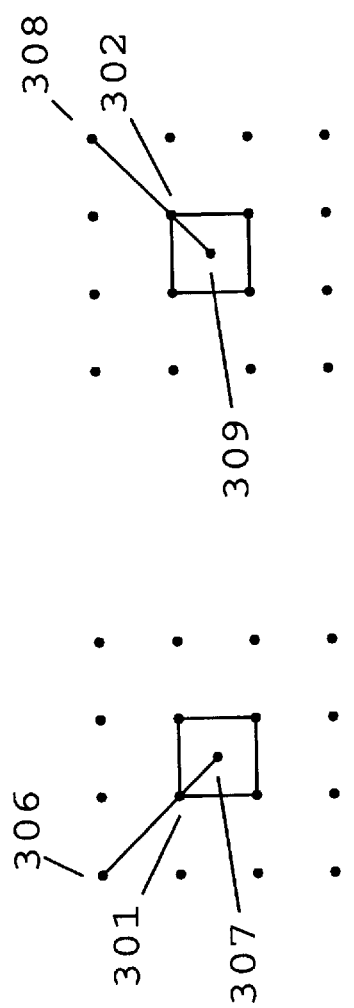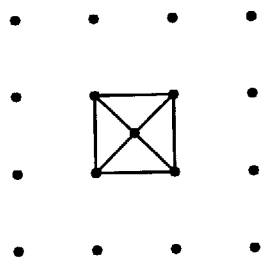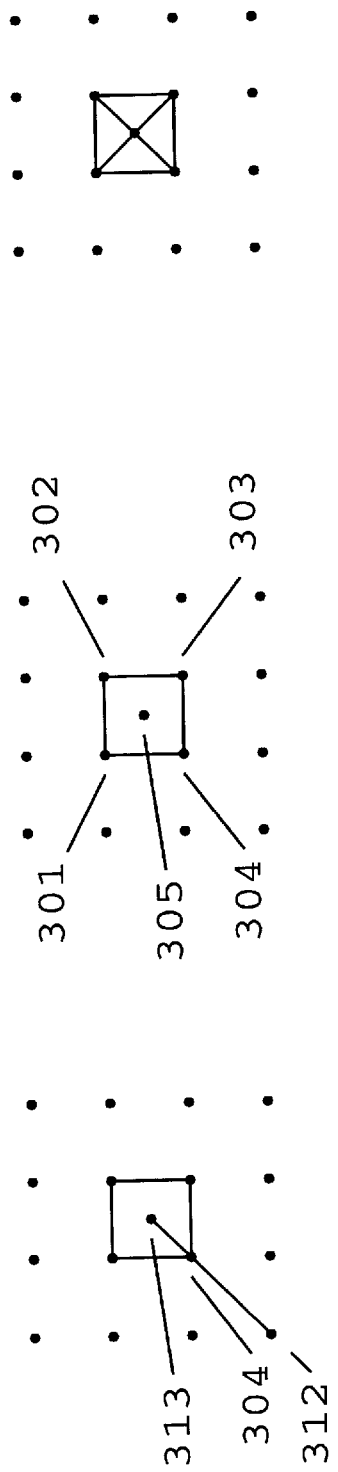

|    |    |    |
|----|----|----|
| 13 | 23 | 33 |
| 12 | 22 ↑ | 32 |
| 11 | 21 | 31 |

Fig. 4b

|    |    |    |
|----|----|----|
| 12 | 22 | 32 |
| 11 | 21 ↑ | 31 |
| 10 | 20 | 30 |

Fig. 4a

| 33 | 32 | 31 |
|----|----|----|
| 23 | ↑ 22 | 21 |
| 13 | 12 | 11 |

Fig. 5a

| 43 | 42 | 41 |
|----|----|----|
| 33 | ↑ 32 | 31 |
| 23 | 22 | 21 |

Fig. 5b

Orthographic Projection    Type: Corner Point Average
Size = 1:8  Data = 1:64

Orthographic Projection   Type: Corner Point Lowest
Size = 1:8  Data = 1:64

Orthographic Projection   Type: Corner Point Average
Size = 1:4  Data = 1:16

Orthographic Projection   Type: Corner Point Highest
Size = 1:4  Data = 1:16

Orthographic Projection   Type: Corner Point Lowest
Size = 1:4  Data = 1:16

Orthographic Projection   Type: Diagonal Average
Size = 1:8  Data = 1:64

Orthographic Projection   Type: Diagonal One_Diag
Size = 1:8  Data = 1:64

Orthographic Projection   Type: Diagonal Highest
Size = 1: 4   Data = 1: 16

DIGITAL MAP COMPRESSION AND DISPLAY METHOD

CROSS REFERENCES TO RELATED APPLICATIONS

This patent application relates to the material disclosed in pending patent application "Digital Map Generator and Display System", Ser. No. 08/944,366 filed Oct. 6, 1997 by the present inventor, which is hereby incorporated by reference.

BACKGROUND OF THE INVENTION

1. Field of Invention

This invention relates to a method for compressing a digital elevation database for a system for displaying three-dimensional terrain data.

2. Discussion of Prior Art

Copending patent application "Digital Map Generator and Display System", Ser. No. 08/944,366 filed Oct. 6, 1997 by the present inventor, describes a digital map system for displaying three-dimensional terrain data using terrain data in the form of polygons. The polygon database is produced from a database of elevation points which are divided into m×n cells which have an elevation point in the center of the cell. The center point forms four polygons with the corners of the cell. The elevation of the center point may be chosen to be the highest elevation point in the m×n cell, the average elevation of the elevation points in the m×n cell, or the elevation of the actual center point.

Other systems using elevation data directly have been developed that present an apparent three-dimensional effect as well as some that present a mathematically correct texture-mapped three-dimensional projected display. Both of these systems require a very large amount of storage for terrain data.

The 1987 patent to Beckwith et al. (U.S. Pat. No. 4,660, 157) compresses terrain data using the Discrete Cosine Transform and stores it on a tape. The compressed data is read from the cassette tape in a controlled manner based on the instantaneous geographical location of the aircraft as provided by the aircraft navigational computer system and reconstructs the compressed data by suitable processing and writing the reconstructed data into a scene memory. Further processing of the data provides a 3D perspective on the display. The aircraft's heading is accounted for by controlling the way the data is read out from the scene memory. Different heading angles result in the data being read from a different sequence of addresses. Since addresses exist only at discrete locations, the truncation of address locations causes an unavoidable change in the map shapes as the aircraft changes heading. Beckwith's method displays only discrete points. This is made very apparent in Beckwith's use of a 'column max memory' in order to eliminate hidden points. The present invention mathematically rotates terrain polygons as the aircraft changes attitude. The resolution is determined by number of bits used to represent the vertices of the polygons, not the number of storage addresses. Further, the present invention displays three-dimensional projected polygons, not discrete points as produced by Beckwith.

The 1989 patent to Chan et al. (U.S. Pat. No. 4,884,971) teaches a method of interpolating elevation values using polynomials. The interpolated values are used in a radar simulator.

The 1990 patent to Beckwith et al. (U.S. Pat. No. 4,970, 682) teaches a database consisting of rows and columns of digital elevation points, which is first compressed using the hybrid discrete cosine transform (DCT) compression algorithm, with differential pulse code modulation (DPCM) being used to transmit the DCT coefficient differences between each row of grid points. During operation the compressed data are read from the cassette tape, reconstructed, and stored in a scene memory with a north-up orientation. A read control circuit then controls the read-out of data from the scene memory with a heading-up orientation to provide a real-time display of the terrain over which the aircraft is passing. The display provided by this system is in the form of a moving map rather than a true perspective display of the terrain as it would appear to the pilot through the window of the aircraft. Note also that the display does not reflect the roll or pitch angles of the aircraft, only the aircraft's heading. Because the Beckwith patent accounts for the aircraft's heading by controlling the way the data is read out from the scene memory, different heading angles result in the data being read from a different sequence of addresses. Since addresses exist only at discrete locations, the truncation of address locations causes an unavoidable change in the map shapes as the aircraft changes heading.

The 1993 patent to Dawson et al. (U.S. Pat. No. 5,179, 638) shows a a method and apparatus for providing a texture mapped perspective view for digital map systems which includes a geometry engine that receives the elevation posts scanned from the cache memory by the shape address generator. A tiling engine is then used to transform the elevation posts, where each square cell is divided into two three-dimensional triangles.

The 1994 patent to Femal et al. (U.S. Pat. No. 5,299,300) teaches an improvement over the Beckwith '682 patent. Where Beckwith teaches database compression by using the Discrete Cosine Transform, Femal achieves database compression by omitting every other row and every other column of the original database. In both Beckwith and Femal, during operation the compressed data are read from the cassette tape, reconstructed, and stored in a scene memory with a north-up orientation. A read control circuit then controls the read-out of data from the scene memory with a heading-up orientation to provide a real-time display of the terrain over which the aircraft is passing. However, whereas in Beckwith the addresses are truncated, causing an unavoidable change in the map shapes as the aircraft changes heading, Femal uses bilinear interpolation to create a plurality of interpolated addresses to create a smoother appearance as the data are read out.

Accordingly, one of the objects and advantages of my invention is to provide a digital map system that produces a mathematically correct three-dimensional projected view of the terrain, using polygons, while reducing the amount of storage required for the database. The invention can be used in a flight simulator or in a video game or in other systems where it is not necessary to exactly reproduce the terrain.

Further objects and advantages of my invention will become apparant from a consideration of the drawings and ensuing description.

SUMMARY OF THE INVENTION

The present invention is a method for compressing a digital elevation database to produce a compressed digital map database which is used by a digital computer system for displaying three-dimensional terrain data in the form of polygons. The compressed digital map database is produced from a database of elevation points by selecting every mth row and every nth column, thereby resulting in a reduction of database storage requirements. During program run-time the intersection of rows and columns forms cells with four corners. The elevation value of a center elevation point for each cell is formed by various methods, thereby creating a cell made up of four three-dimensional triangles. One method for creating the elevation of the center elevation point uses the elevations of the four corners of the cell. Another method uses extrapolated elevation values from the cell's extended diagonals. The three-dimensional triangles formed from the center elevation point are then transformed and projected using standard computer graphics methods to produce a three-dimensional projected display.

DESCRIPTION OF THE DRAWINGS

FIG. 3a shows a corner elevation point and an extended corner elevation point used for producing an extrapolated center elevation point.

FIG. 3b shows a second corner elevation point and an extended corner elevation point used for producing an extrapolated center elevation point.

FIG. 3c shows a third corner elevation point and an extended corner elevation point used for producing an extrapolated center elevation point.

FIG. 3d shows a fourth corner elevation point and an extended corner elevation point used for producing an extrapolated center elevation point.

FIG. 3e shows the corner elevation points and the center elevation point for a typical cell.

FIG. 3f shows how the corner elevation points and the center elevation point for a typical cell form four polygons.

FIG. 4a shows the impending crossover from Geographic Data Block 21 to Geographic Data Block 22.

FIG. 4b shows the result of a crossover from Geographic Data Block 21 to Geographic Data Block 22.

FIG. 5a shows the impending crossover from Geographic Data Block 22 to Geographic Data Block 32.

FIG. 5b shows the result of a crossover from Geographic Data Block 22 to Geographic Data Block 32.

DETAILED SPECIFICATION

THE DIGITAL ELEVATION MODEL DATABASE

The U.S. Geological Survey (USGS) has available a digital elevation database called the Digital Elevation Model which consists of an array of regularly spaced terrain elevations. It can be purchased on 9 track tape or it can be downloaded from the USGS ftp site on the Internet. The data used as an example to illustrate the present invention is from the SEATTLE-E DEM file downloaded from the USGS ftp site. For the purposes of illustration the elevation values are exaggerated.

DATABASE COMPRESSION

Figure 1D:
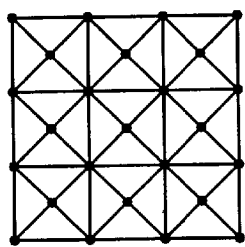
FIG. 1d shows the grid of FIG. 1c where the center elevation points form four polygons in each cell.
Figure 1H:
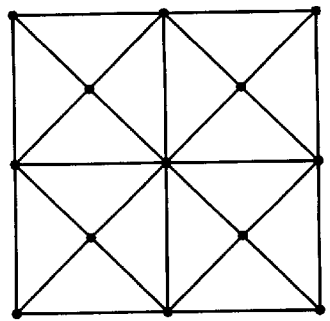
FIG. 1h shows the grid of FIG. 1g where the center elevation points form four polygons in each cell.

The present invention compresses the digital elevation database by taking every mth row and every nth column of the original database. This technique produces a compressed digital map database because there are now 1/m the number of rows and 1/n the number of columns so that the final database size is 1/(m*n). FIG. 1a shows a grid of forty-nine points, representing seven rows and seven columns. In FIG. 1b, every second row and every second column have been selected. Since m=n=2, the compressed database is ¼ the size of the original database. FIG. 1e shows a grid of eighty-one points, representing nine rows and nine columns. In FIG. 1f, every fourth row and every fourth column have been selected. Since m=n=4, the compressed database is 1/16 the size of the original database.

During program run-time the intersections of rows and columns form cells with four corner elevation points. The elevation value of a center elevation point for each cell is formed by various methods, thereby creating a cell made up of four three-dimensional triangles. The reason for this is that a triangle is guaranteed to be planar. A polygon with more than three sides is not guaranteed to be planar.

Figure 2D:
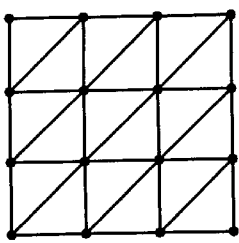
FIG. 2d shows a group of typical cells produced by the Dawson method.
Figures 2A, 2B, 2C:
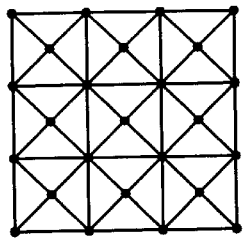
FIG. 2a shows a typical cell produced by the present invention.
FIG. 2b shows a group of typical cells produced by the present invention.
FIG. 2c shows a typical cell produced by the Dawson method.

FIG. 2a shows a typical cell made of corner elevation points 201, 202, 203, and 204. Center elevation point 205 is used to form four triangles within the cell:

1. the triangle made from points 205, 201, and 202;
2. the triangle made from points 205, 202, and 203;
3. the triangle made from points 205, 203, and 204; and
4. the triangle made from points 205, 204, and 201;

FIG. 2b shows a group of typical cells produced by the present invention.

Note how this is different from the method taught by Dawson. In Dawson's method, as shown in FIG. 2c, the cell with corner elevation points 206, 207, 208, and 209 is divided into two triangles by diagonal line 210 connecting corner elevation points 206 and 208.

The two triangles are:

1. the triangle made from points 206, 207, and 208; and
2. the triangle made from points 208, 209, and 206.

FIG. 2d shows a group of typical cells produced by the Dawson method.

Figure 1C:
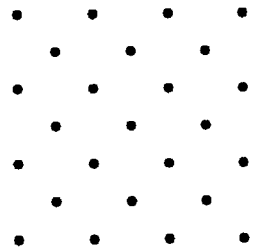
FIG. 1c shows the grid of FIG. 1b where a center elevation point has been added to each cell.
Figure 1G:
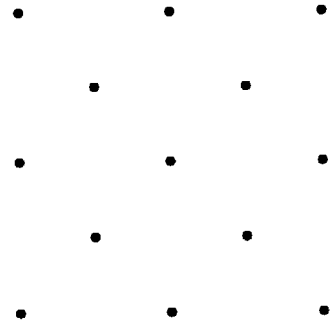
FIG. 1g shows the grid of FIG. 1f where a center elevation point has been added to each cell.
Figure 1B:
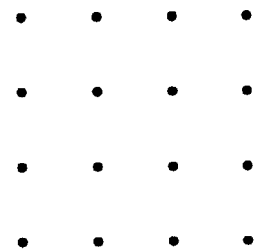
FIG. 1b shows the grid of FIG. 1a where only every second row and every second column are selected.
Figure 1F:
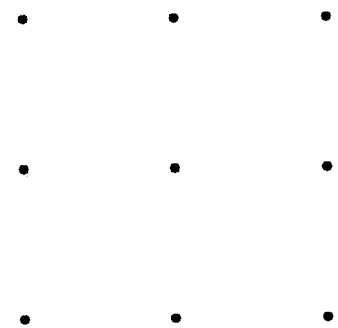
FIG. 1f shows the grid of FIG. 1e where only every fourth row and every fourth column are selected.
Figure 1A:
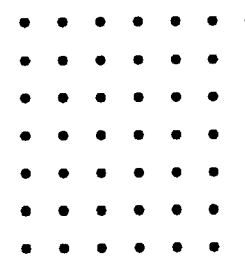
FIG. 1a shows a grid of points representing the rows and columns of a digital elevation database.
Figure 1E:
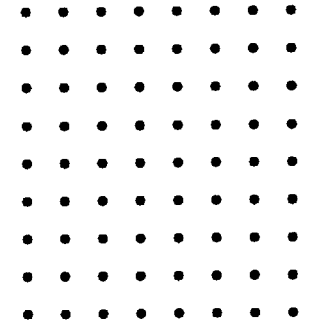
FIG. 1e shows a grid of points representing the rows and columns of a digital elevation database.

In the present invention, FIG. 1c shows the center points added to the compressed digital map database of FIG. 1b during program run-time. FIG. 1d shows that in each cell the center elevation point creates four triangles. FIG. 1g shows the center points added to the compressed digital map database of FIG. 1f during program run-time. FIG. 1h shows that in each cell the center elevation point creates four triangles.

One method for creating the elevation of the center elevation point uses the elevations of one or more of the four corners of the cell. The elevation of the center elevation point may be derived by one of the following:

1. Taking the average of the elevations of the four corner elevation points;
2. Taking the highest of the elevations of the four corner elevation points;
3. Taking the lowest of the elevations of the four corner elevation points. Regardless of the particular method used, the three-dimensional triangles formed from the center elevation point are then transformed and projected using standard computer graphics methods to produce a three-dimensional projected display.

Figure 6:
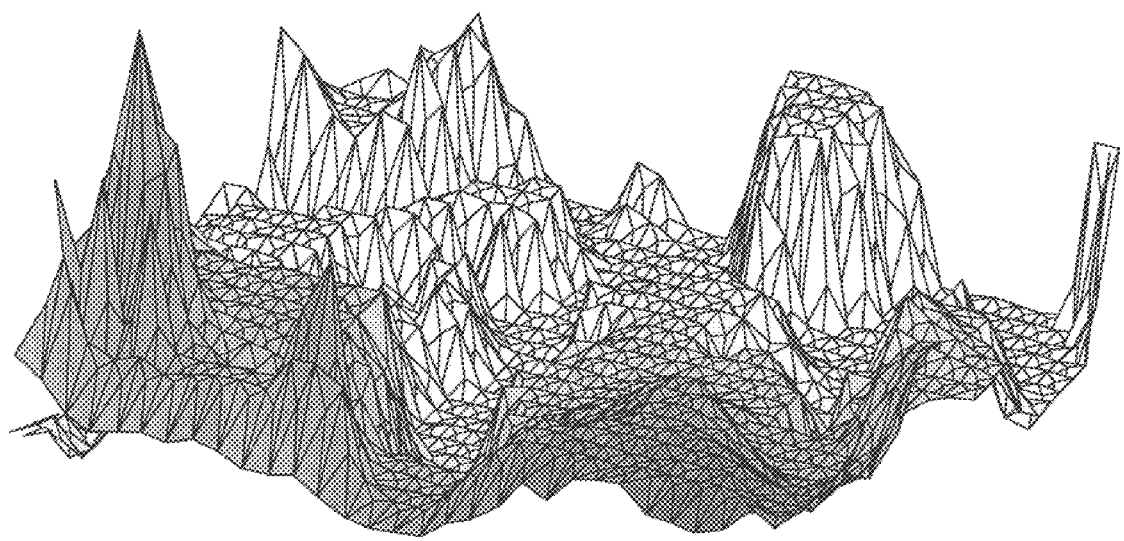
FIG. 6 is a picture of an orthographic projection of a representative database consisting of polygons produced by taking every eighth row and every eighth column from a database of digital elevation points where the elevation of the center elevation point is the average of the elevations of the four corner elevation points.

FIG. 6 is a picture of an orthographic projection of a representative database consisting of polygons produced by taking every eighth row and every eighth column from a database of digital elevation points where the elevation of the center elevation point is the average of the elevations of the four corner elevation points.

Figure 7:
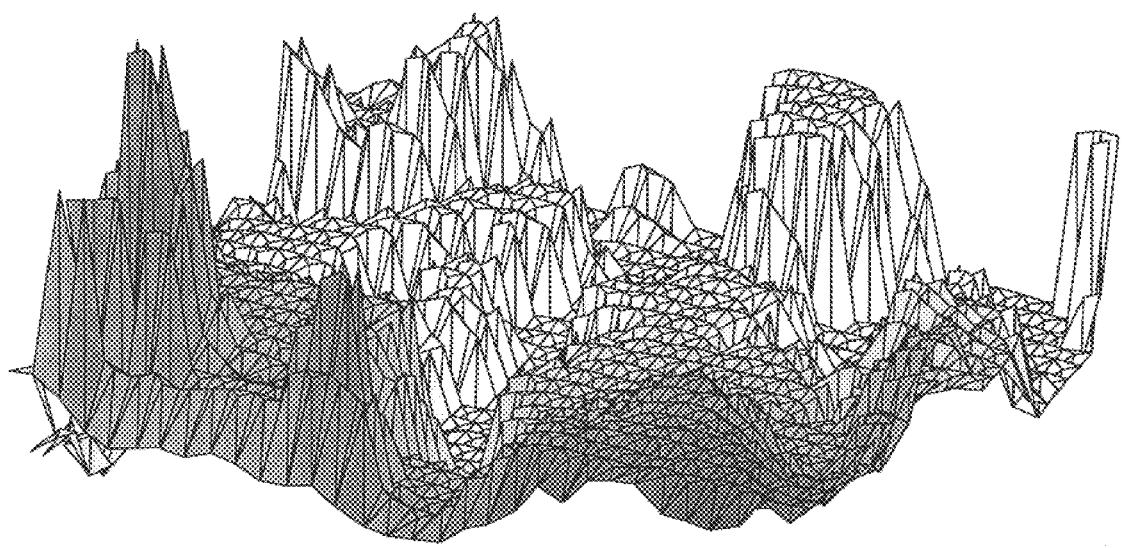
FIG. 7 is a picture of an orthographic projection of a representative database consisting of polygons produced by taking every eighth row and every eighth column from a database of digital elevation points where the elevation of the center elevation point is the highest of the elevations of the four corner elevation points.

FIG. 7 is a picture of an orthographic projection of a representative database consisting of polygons produced by taking every eighth row and every eighth column from a database of digital elevation points where the elevation of the center elevation point is the highest of the elevations of the four corner elevation points.

Figure 8:
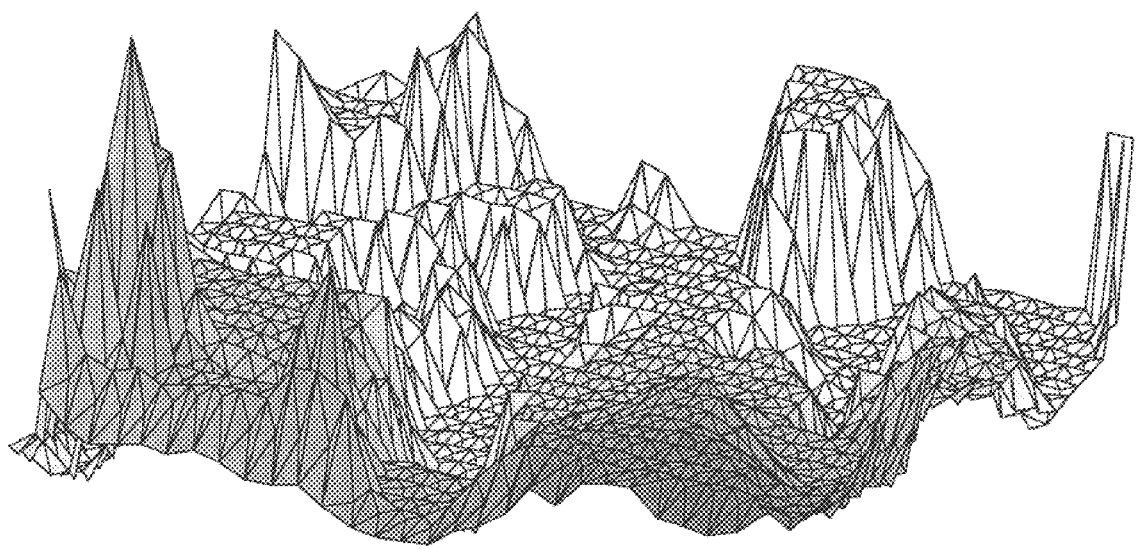
FIG. 8 is a picture of an orthographic projection of a representative database consisting of polygons produced by taking every eighth row and every eighth column from a database of digital elevation points where the elevation of the center elevation point is the lowest of the elevations of the four corner elevation points.

FIG. 8 is a picture of an orthographic projection of a representative database consisting of polygons produced by taking every eighth row and every eighth column from a database of digital elevation points where the elevation of the center elevation point is the lowest of the elevations of the four corner elevation points.

Figure 9:
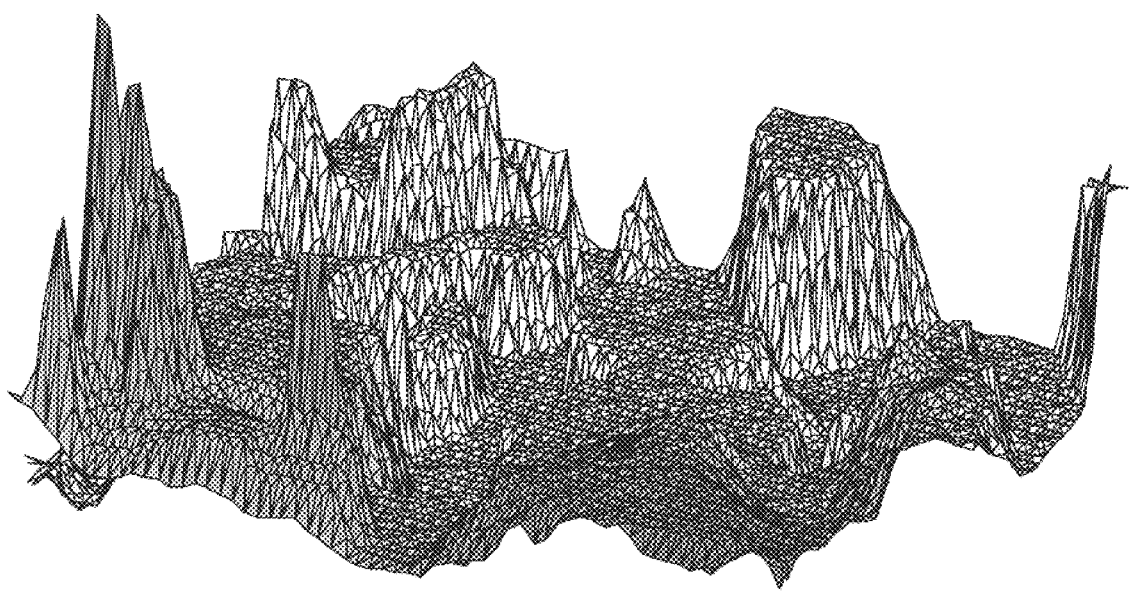
FIG. 9 is a picture of an orthographic projection of a representative database consisting of polygons produced by taking every fourth row and every fourth column from a database of digital elevation points where the elevation of the center elevation point is the average of the elevations of the four corner elevation points.

FIG. 9 is a picture of an orthographic projection of a representative database consisting of polygons produced by taking every fourth row and every fourth column from a database of digital elevation points where the elevation of the center elevation point is the average of the elevations of the four corner elevation points.

Figure 10:
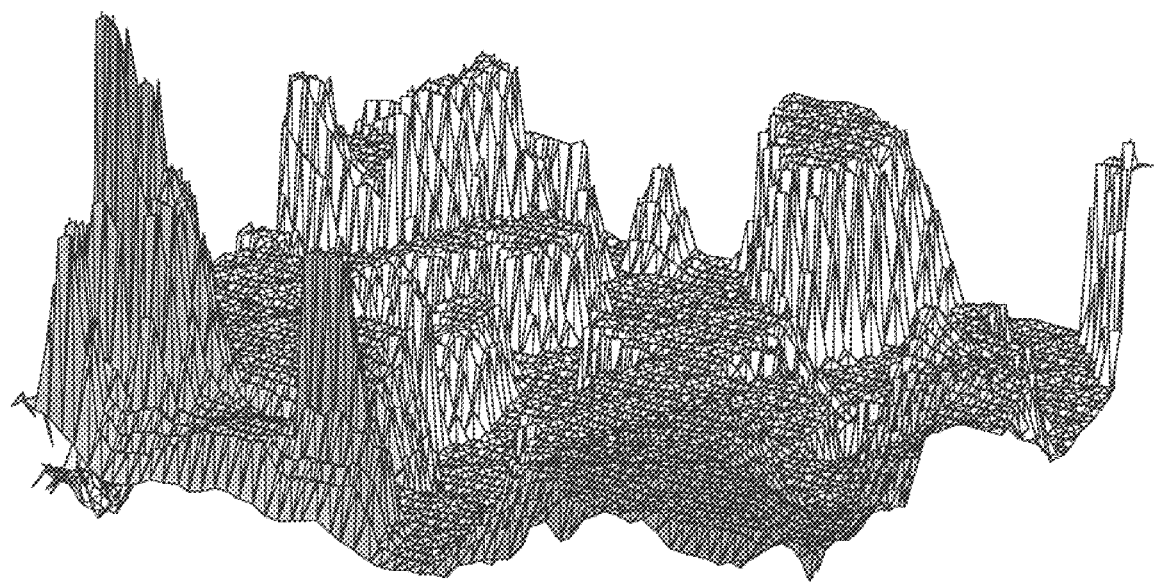
FIG. 10 is a picture of an orthographic projection of a representative database consisting of polygons produced by taking every fourth row and every fourth column from a database of digital elevation points where the elevation of the center elevation point is the highest of the elevations of the four corner elevation points.

FIG. 10 is a picture of an orthographic projection of a representative database consisting of polygons produced by taking every fourth row and every fourth column from a database of digital elevation points where the elevation of the center elevation point is the highest of the elevations of the four corner elevation points.

Figure 11:
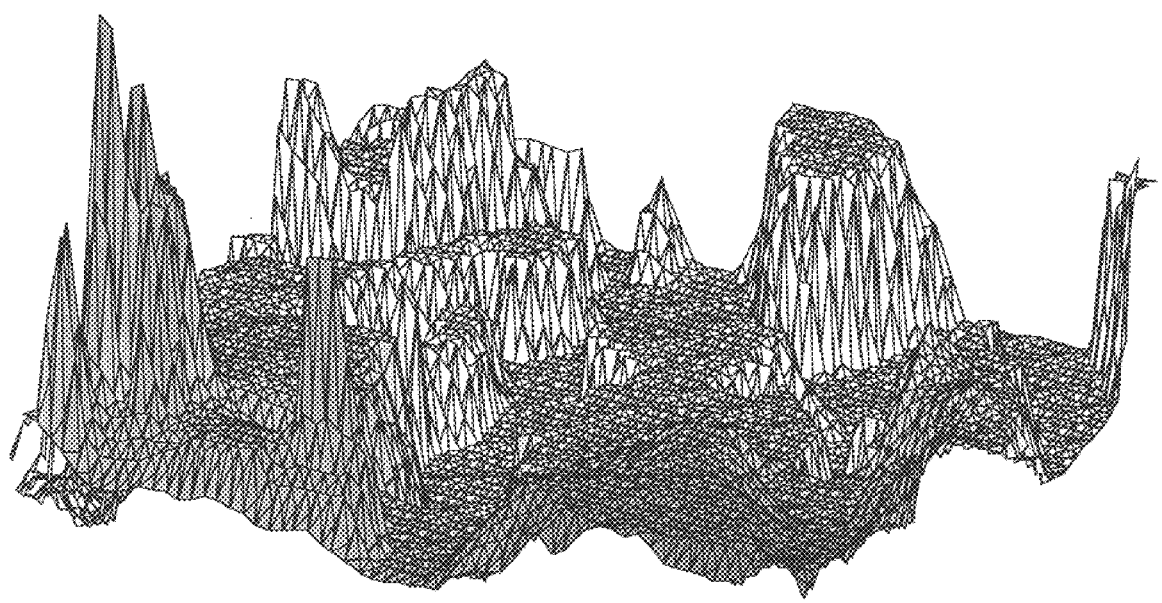
FIG. 11 is a picture of an orthographic projection of a representative database consisting of polygons produced by taking every fourth row and every fourth column from a database of digital elevation points where the elevation of the center elevation point is the lowest of the elevations of the four corner elevation points.

FIG. 11 is a picture of an orthographic projection of a representative database consisting of polygons produced by taking every fourth row and every fourth column from a database of digital elevation points where the elevation of the center elevation point is the lowest of the elevations of the four corner elevation points.

Another method uses extrapolated elevation values from the cell's extended diagonals. Since there are four corners there will be four extended diagonals.

Figure 2E:
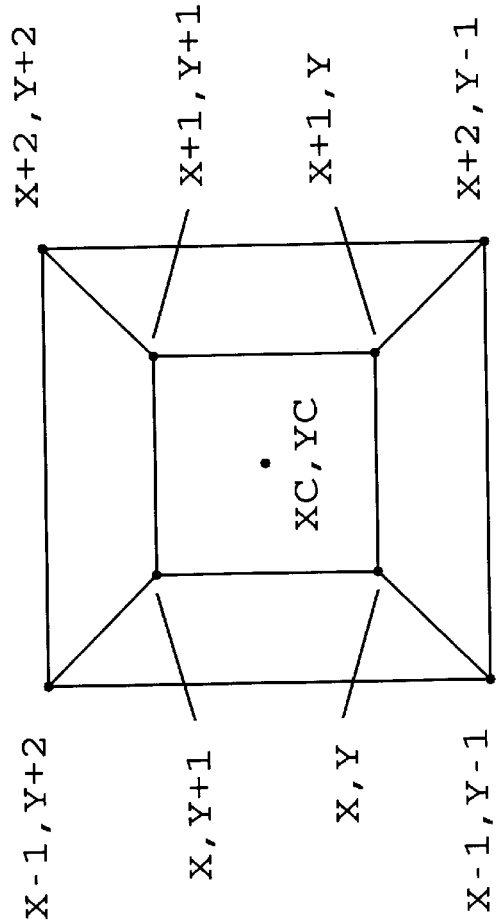
FIG. 2e shows the coordinate points that form the extended diagonals.

Referring to FIG. 2e, for a cell with corners at (x,y), (x+1,y), (x+1,y+1), and (x,y+1) the extended diagonals are formed from the point pairs:

1. (x,y+1) and (x−1,y+2);
2. (x+1,y+1) and (x+2,y+2);
3. (x+1,y) and (x+2,y−1);
4. (x,y) and (x−1,y−1).

The center point elevation ZC1 formed by extrapolating the elevations at (x,y+1) and (x−1,y+2) is:

$$ZC1=Z(x,y+1)+(Z(x,y+1)-Z(x-1,y+2)) * 0.5$$

This is shown in FIG. 3a (where the coordinate point labels have been replaced by number designations to reduce clutter) where the elevation of the extrapolated center elevation point 307 is calculated from points 301 and 306 by the formula: **Z(307)=Z(301)+(Z(301)−Z(306)) * 0.5**

The center point elevation ZC2 formed by extrapolating the elevations at (x+1,y+1) and (x+2,y+2) is:

$$ZC2=Z(x+1,y+1)+(Z(x+1,y+1)-Z(x+1,y+2)) * 0.5$$

This is shown in FIG. 3b (where the coordinate point labels have been replaced by number designations to reduce clutter) where the elevation of the extrapolated center elevation point 309 is calculated from points 302 and 308 by the formula: **Z(309)=Z(302)+(Z(302)−Z(308)) * 0.5**

The center point elevation ZC3 formed by extrapolating the elevations at (x+1,y) and (x+2,y−1) is:

$$ZC3=Z(x+1,y)+(Z(x+1,y)-Z(x+2,y-1)) * 0.5$$

This is shown in FIG. 3c (where the coordinate point labels have been replaced by number designations to reduce clutter) where the elevation of the extrapolated center elevation point 311 is calculated from points 303 and 310 by the formula: **Z(311)=Z(303)+(Z(303)−Z(310)) * 0.5**

The center point elevation ZC4 formed by extrapolating the elevations at (x,y) and (x−1,y−1) is:

$$ZC4=Z(x,y)+(Z(x,y)-Z(x-1,y-1)) * 0.5$$

This is shown in FIG. 3d (where the coordinate point labels have been replaced by number designations to reduce clutter) where the elevation of the extrapolated center elevation point 313 is calculated from points 304 and 312 by the formula: **Z(313)=Z(304)+(Z(304)−Z(312)) * 0.5**

The elevation of center elevation point 305 may be derived by one of the following:

1. Taking the average of Z(307), Z(309), Z(311) and Z(313);
2. Taking the highest value of Z(307), Z(309), Z(311) and Z(313);
3. Taking the lowest value of Z(307), Z(309), Z(311) and Z(313);
4. Taking a single value of Z(307), Z(309), Z(311) or Z(313);

Regardless of the particular method used, a cell is formed, as shown in FIG. 3e, with corner elevation points 301, 302, 303, and 304 with a center elevation point 305. The three-dimensional triangles formed from the center elevation point, as shown in FIG. 3f, are then transformed and projected using standard computer graphics methods to produce a three-dimensional projected display.

Figure 12:
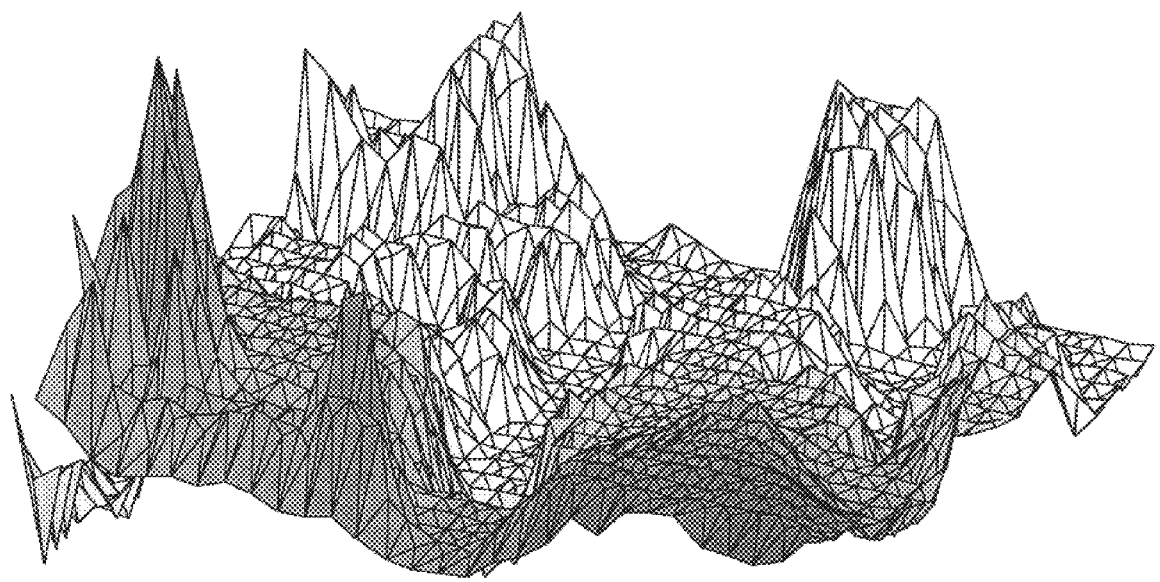
FIG. 12 is a picture of an orthographic projection of a representative database consisting of polygons produced by taking every eighth row and every eighth column from a database of digital elevation points where the elevation of the center elevation point is the average of the elevations of the extrapolated extended cell diagonals.

FIG. 12 is a picture of an orthographic projection of a representative database consisting of polygons produced by taking every eighth row and every eighth column from a database of digital elevation points where the elevation of the center elevation point is the average of the elevations of the extrapolated extended cell diagonals.

Figure 13:
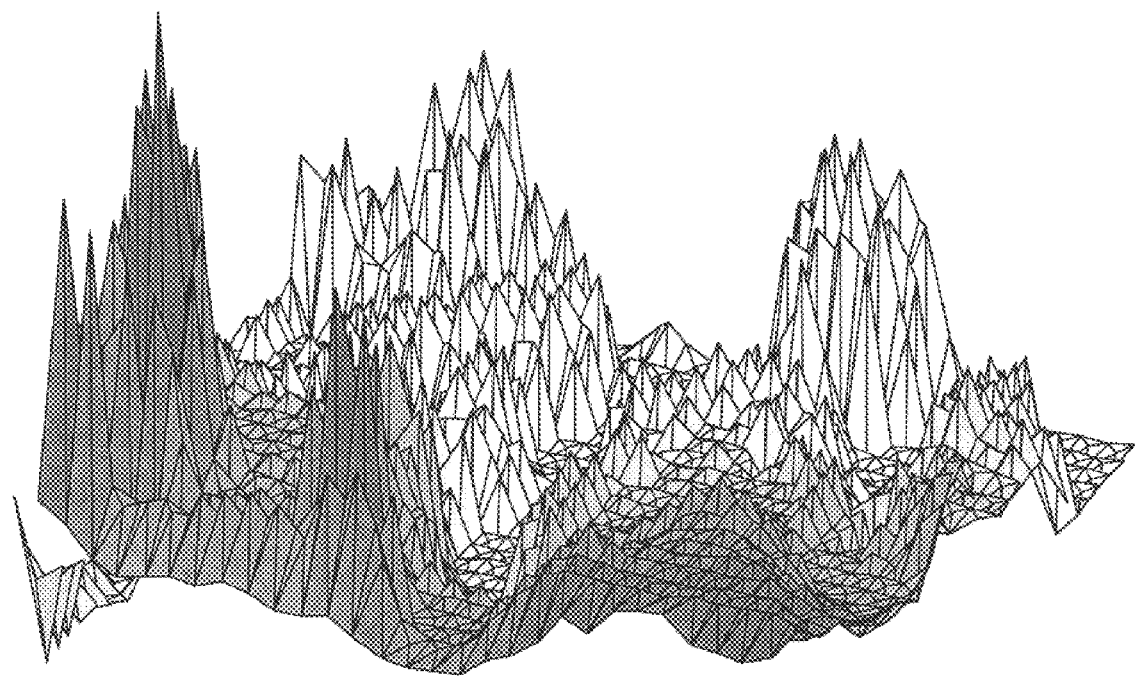
FIG. 13 is a picture of an orthographic projection of a representative database consisting of polygons produced by taking every eighth row and every eighth column from a database of digital elevation points where the elevation of the center elevation point is the highest of the elevations of the extrapolated extended cell diagonals.

FIG. 13 is a picture of an orthographic projection of a representative database consisting of polygons produced by taking every eighth row and every eighth column from a database of digital elevation points where the elevation of the center elevation point is the highest of the elevations of the extrapolated extended cell diagonals.

Figure 14:
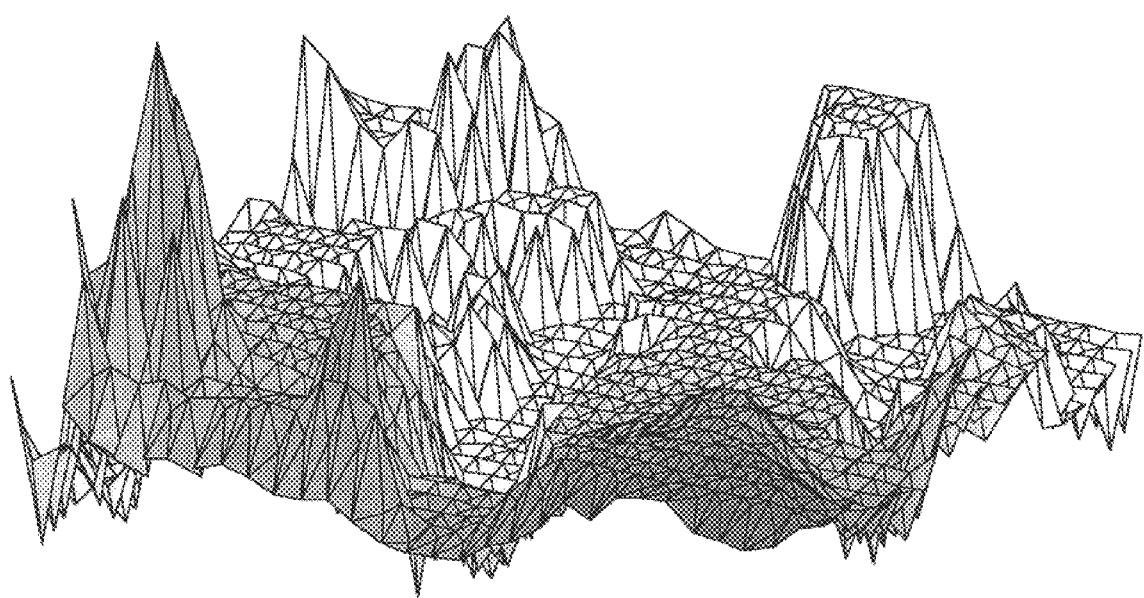
FIG. 14 is a picture of an orthographic projection of a representative database consisting of polygons produced by taking every eighth row and every eighth column from a database of digital elevation points where the elevation of the center elevation point is the lowest of the elevations of the extrapolated extended cell diagonals.

FIG. 14 is a picture of an orthographic projection of a representative database consisting of polygons produced by taking every eighth row and every eighth column from a database of digital elevation points where the elevation of the center elevation point is the lowest of the elevations of the extrapolated extended cell diagonals.

Figure 15:
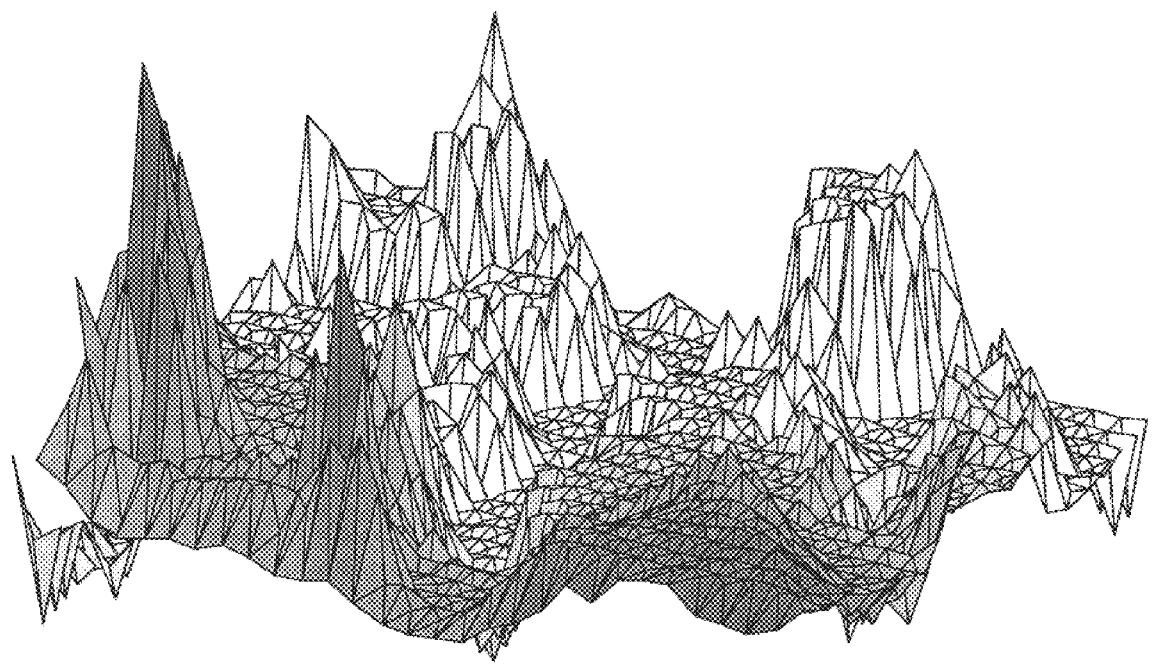
FIG. 15 is a picture of an orthographic projection of a representative database consisting of polygons produced by taking every eighth row and every eighth column from a database of digital elevation points where the elevation of the center elevation point is one of the elevations of the extrapolated extended cell diagonals.

FIG. 15 is a picture of an orthographic projection of a representative database consisting of polygons produced by taking every eighth row and every eighth column from a database of digital elevation points where the elevation of the center elevation point is one of the elevations of the extrapolated extended cell diagonals.

Figure 16:
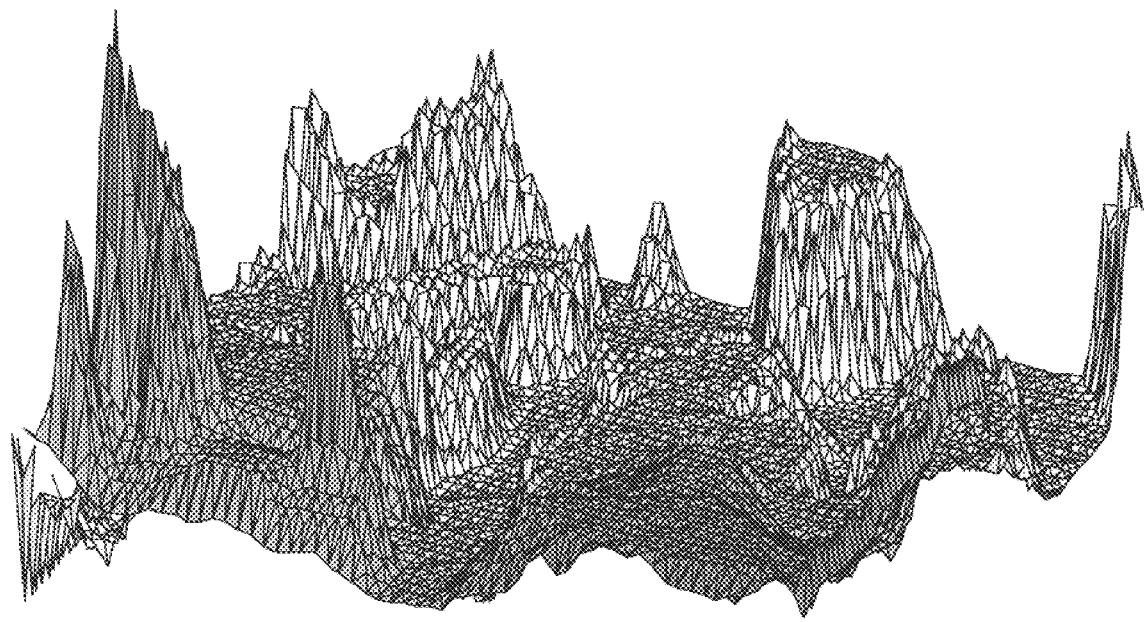
FIG. 16 is a picture of an orthographic projection of a representative database consisting of polygons produced by taking every fourth row and every fourth column from a database of digital elevation points where the elevation of the center elevation point is the average of the elevations of the extrapolated extended cell diagonals.

FIG. 16 is a picture of an orthographic projection of a representative database consisting of polygons produced by taking every fourth row and every fourth column from a database of digital elevation points where the elevation of the center elevation point is the average of the elevations of the extrapolated extended cell diagonals.

Figure 17:
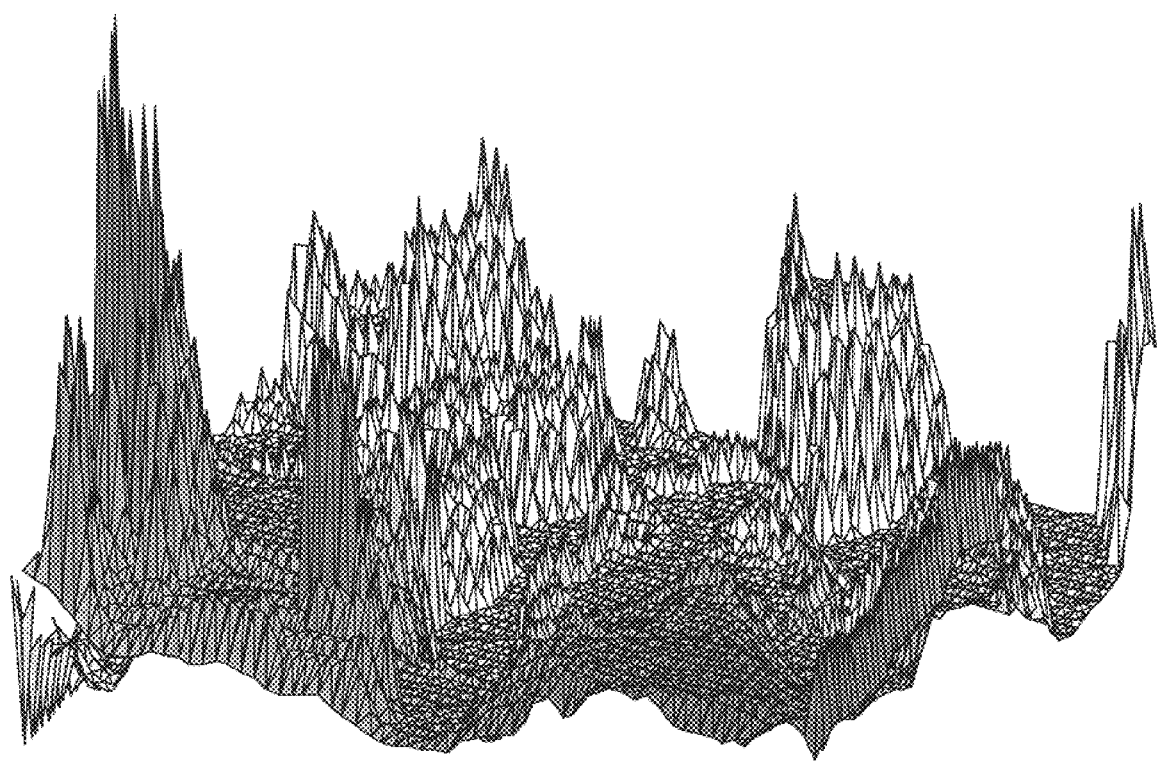
FIG. 17 is a picture of an orthographic projection of a representative database consisting of polygons produced by taking every fourth row and every fourth column from a database of digital elevation points where the elevation of the center elevation point is the highest of the elevations of the extrapolated extended cell diagonals.

FIG. 17 is a picture of an orthographic projection of a representative database consisting of polygons produced by taking every fourth row and every fourth column from a database of digital elevation points where the elevation of the center elevation point is the highest of the elevations of the extrapolated extended cell diagonals.

Figure 18:
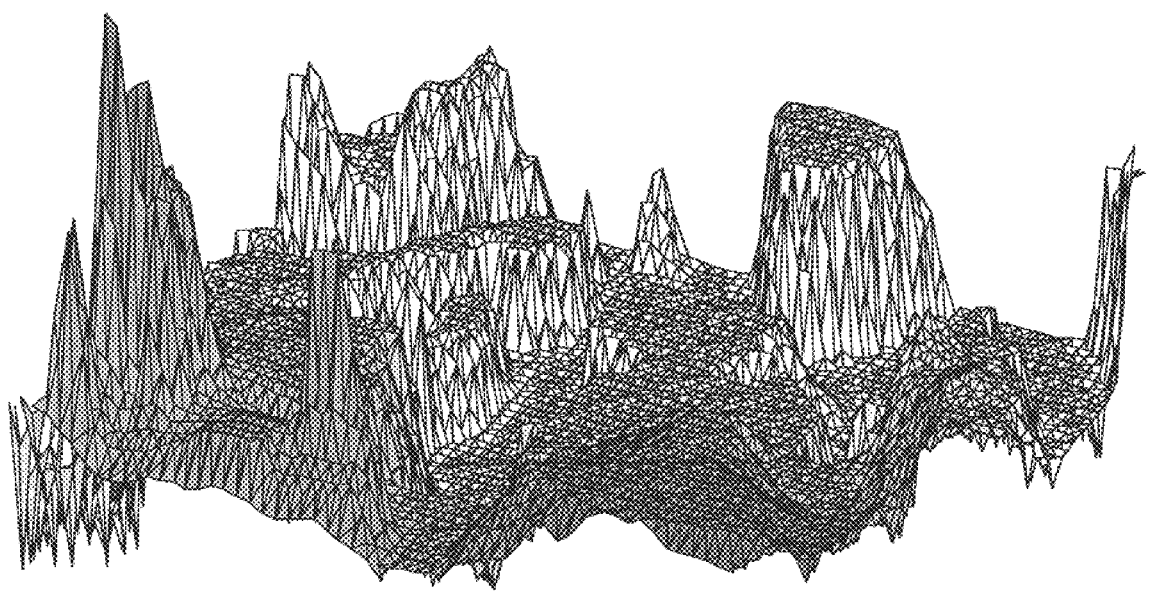
FIG. 18 is a picture of an orthographic projection of a representative database consisting of polygons produced by taking every fourth row and every fourth column from a database of digital elevation points where the elevation of the center elevation point is the lowest of the elevations of the extrapolated extended cell diagonals.

FIG. 18 is a picture of an orthographic projection of a representative database consisting of polygons produced by taking every fourth row and every fourth column from a database of digital elevation points where the elevation of the center elevation point is the lowest of the elevations of the extrapolated extended cell diagonals.

Figure 19:
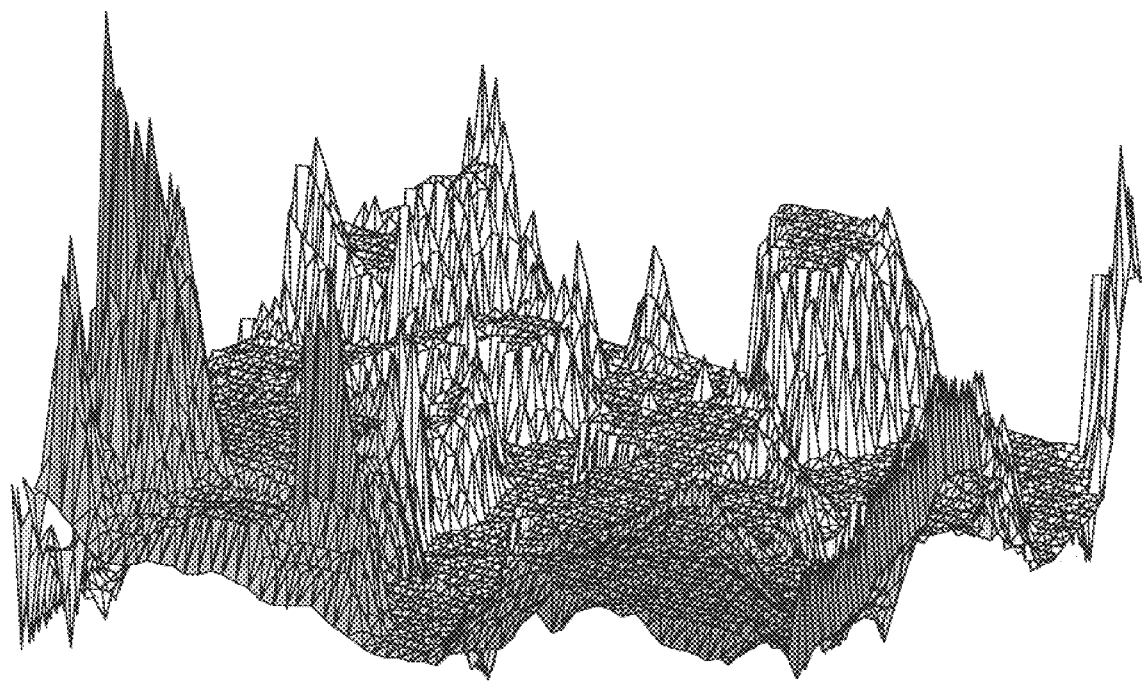
FIG. 19 is a picture of an orthographic projection of a representative database consisting of polygons produced by taking every fourth row and every fourth column from a database of digital elevation points where the elevation of the center elevation point is one of the elevations of the extrapolated extended cell diagonals.

FIG. 19 is a picture of an orthographic projection of a representative database consisting of polygons produced by taking every fourth row and every fourth column from a database of digital elevation points where the elevation of the center elevation point is one of the elevations of the extrapolated extended cell diagonals.

DATABASE REDUCTION

The Digital Elevation Model data elevations are spaced 30 meters apart. 30 meters=30 m×39.37 in/m×1 ft/12 in=98.245 ft A linear mile contains 5,280 ft/mi×1 data point/98.245 ft=53.65 data points/mi Therefore, a square mile contains 53.65×53.65=2878 data points.

California has a total area of 158,706 square miles which requires 158,706×2878=456,755,868 data points. Assuming each elevation point requires 16 bits, this requires 913,511,736 bytes. This is more than would fit on a standard CD Rom disc which stores 650M bytes.

The U.S. has a total area of 3,618,773 square miles which requires 3,618,773×2878=10,414,828,694 data points, requiring 20,829,657,388 bytes. This would require 32 CD ROM discs.

Using a database reduction of 1:64, the database for California would require 913,511,736 bytes/64=14,273,621 bytes. The database for the U.S. would require 20,829,657, 388 bytes/64=325,463,397 bytes. This is slightly more data than fits on one-half of a CD ROM disc, leaving the remainder for natural and manmade features as well as the computer program.

After determining the amount of data reduction to be used, the elevation points are stored linearly with consecutive columns of corner points. The x and y of each point is a function of its position in the file. The z value is the elevation data stored at that address. In operation, this data is read by the computer into its memory and operated on by standard mathematical transformations used by the computer graphics industry.

During the creation of the database, the data is organized in geographic blocks. In operation these geographic blocks are accessed so that there is always the proper data present. This is shown in FIG. 4a. FIG. 4b shows that when the user crosses from Block 21 to Block 22, the data from Blocks 10, 20, and 30 are discarded and data from Blocks 13, 23, and 33 are brought in. FIG. 5a and FIG. 5b show the user crossing from Block 22 to Block 32.

Geographic data blocks may use different amounts of compression so that areas of special interest, such as around airports, may be represented in greater detail and therefore with less compression.

For example, if the 20 largest airports in the U.S. were represented as 10 mi×10 mi blocks with no data reduction (1:1), it would require only 20×10×10×2878×2=11,512,000 bytes of storage.

ADDITIONAL DATABASES

Another USGS database that can be used is the Digital Line Graph data which includes: political and administrative boundaries; hydrography consisting of all flowing water, standing water, and wetlands; major transportation systems consisting of roads and trails, railroads, pipelines, transmission lines, and airports; and significant manmade structures. The Digital Line Graph data is two-dimensional. In the present invention features such as water, roads, railroads, and pipelines are represented as polygons with elevations determined from the Digital Elevation Model data. Transmission lines and significant manmade structures are defined as three-dimensional objects made of polygons and are placed according to the elevations determined from the Digital Elevation Model data. The different types of objects are tagged so that the user can select them to be highlighted by category or by specific object. For example, the user can choose to have all airports highlighted or just the destination airport. The user can also choose to have a specific highway highlighted.

Data from additional digital databases can also be incorporated. An example of such a database is from Jeppesen Sanderson whose NavData Services division provides aeronautical charts and makes this information available in digital form.

3D MATH

The math for the present invention has been used in the field of coin-operated video games and in traditional computer graphics and is documented in copending application Ser. No. 08/944,366 filed Oct. 6, 1997 by the present inventor. This copending application also contains a C computer program that demonstrates the basic principles presented therein.

POLYGON EDGE ENHANCEMENT

To prevent a polygon from blending in with its neighbors in a system with a limited number of bits per pixel, polygons can be drawn so that its edges are a different color or shade from its interior. An example of this is shown in FIG. 6.

While preferred embodiments of the present invention have been shown, it is to be expressly understood that modifications and changes may be made thereto and that the present invention is set forth in the following claims.

I claim:

1. A method for compressing a digital elevation database to produce a compressed digital map database for displaying three-dimensional polygons comprising the computer implemented steps of:
   a) providing a digital elevation database, said digital elevation database comprising elevation points arranged in an array of rows and columns;
   b) producing a compressed digital map database by taking every mth row and every nth column of said digital elevation database, wherein m and n are greater than 1;
   c) during program run-time performing the steps of:
      (i) determining a center elevation point in the center of each cell of said compressed digital map database, whereby each said cell comprises four corner elevation points formed by the intersections of rows and columns of said compressed digital map database, and whereby said center elevation point is calculated by the steps of:
         (a) calculating the elevations of the extrapolated extended cell diagonals:
            (i) $ZC1=Z(x,y+1)+(Z(x,y+1)-Z(x-1,y+2)) * 0.5$;
            (ii) $ZC2=Z(x+1,y+1)+(Z(x+1,y+1)-Z(x+1,y+2)) * 0.5$;
            (iii) $ZC3=Z(x+1,y)+(Z(x+1,y)-Z(x+2,y-1)) * 0.5$;
            (iv) $ZC4=Z(x,y)+(Z(x,y)-Z(x-1,y-1)) * 0.5$;
         (b) taking the average value of ZC1, ZC2, ZC3, and ZC4;
      (ii) using said center elevation point to produce four three-dimensional triangles, each three-dimensional triangle formed from said center elevation point and two adjacent corner elevation points forming a side of said cell;
      (iii) transforming and projecting a plurality of cells composed of said four three-dimensional triangles for display on a video display.

2. The method of claim 1 wherein at least one of said three-dimensional triangles is displayed such that at least one edge of said at least one of said three-dimensional triangles has a different appearance than a central portion of said at least one of said three-dimensional triangles.

3. The method of claim 1 wherein said compressed digital map database comprises a plurality of geographic blocks, each geographic block representing a geographic area, wherein a first geographic block may have a different resolution from a second geographic block.

4. The method of claim 1 wherein said center elevation point is determined by taking the lowest elevation of said four corner elevation points of said cell.

5. The method of claim 1 wherein said center elevatoin point is determined by performing the steps of:
   a) calculating the elevations of the extrapolaed extended point is determined by performing the steps of:
      (i) $ZC1=Z(x,y+1)+(Z(x,y+1)-Z(x-1,y+2))*0.5$;
      (ii) $ZC2=Z(x+1,y+1)+(Z(x+1,y+1)-Z(x+1,y+2))*0.5$;
      (iii) $ZC3=Z(x+1,y)+(Z(x+1,y)-Z(x+2,y-1))*0.5$;
      (iv) $ZC4=Z(x,y)+(Z(x,y)-Z(x-1,y-1))*0.5$;
   b) taking the average value of ZC1, ZC2, ZC3, and ZC4.

6. The method of claim 1 wherein said center elevation point is determined by performing the steps of:

a) calculating the elevations of the extrapolated extended cell diagonals:
  (i) ZC1=Z(x,y+1)+(Z(x,y+1)−Z(x−1,y+2))*0.5;
  (ii) ZC2=Z(x+1,y+1) +(Z(x+1,y+1)−Z(x+1,y+2))*0.5;
  (iii) ZC3=Z(x+1,y)+(Z(x+1,y)−Z(x+2,y−1))*0.5;
  (iv) ZC4=Z(x,y)+(Z(x,y)−Z(x−1,y−1))*0.5;
b) taking the highest value of ZC1, ZC2, ZC3, and ZC4.

7. The method of claim 1 wherein said center elevation point is determined by performing the steps of:
a) calculating the elevations of the extrapolated extended cell diagonals:
  (i) ZC1=Z(x,y+1)+(Z(x,y+1)−Z(x−1,y+2))*0.5;
  (ii) ZC2=Z(x+1,y+1) +(Z(x+1,y+1)−Z(x+1,y+2))*0.5;
  (iii) ZC3=Z(x+1,y)+(Z(x+1,y)−Z(x+2,y−1))*0.5;
  (iv) ZC4=Z(x,y)+(Z(x,y)−Z(x−1,y−1))*0.5;
taking the lowest value of ZC1, ZC2, ZC3, and ZC4.

8. The method of claim 1 wherein said center elevation point is determined by performing the steps of:
a) calculating the elevations of the extrapolated extended cell diagonals:
  (i) ZC1=Z(x,y+1)+(Z(x,y+1)−Z(x−1,y+2))*0.5;
  (ii) ZC2=Z(x+1,y+1) +(Z(x+1,y+1)−Z(x+1,y+2))*0.5;
  (iii) ZC3=Z(x+1,y)+(Z(x+1,y)−Z(x+2,y−1))*0.5;
  (iv) ZC4=Z(x,y)+(Z(x,y)−Z(x−1,y−1))*0.5;
taking one of the values of ZC1, ZC2, ZC3, and ZC4.

9. The method of claim 1 wherein at least one of said three-dimensional triangles is displayed such that at least one edge of said at least one of said three-dimensional triangles has a different appearance than a central portion of said at least one of said three-dimensional triangles.

10. The method of claim 1 wherein said compressed digital map database comprises a plurality of geographic blocks, each geographic block representing a geographic area, wherein a first geographic block may have a different resolution from a second geographic block.

11. A method for comprising a digital elevatoin database to produce a compressed digital map database for displaying three-dimensional polygons comprising the computer implemented steps of:
a) providing a digital elevation database, said digital elevation database comprising elevation points arranged in an array of rows and columns;
b) producing a compressed digital map database by taking every mth row and every nth column of said digital elevation database, wherein m and n are greater than 1;
during program run-time performing the steps of:
  (i) determining a center elevatoin point in the center of each of cell of said compressed digital map database, whereby each said cell comprises four corner elevation points formed by the intersections of rows and columns of said compressed digital map database, and whereby the elevation of said center elevation point is calculated by taking the average elevation of said four corner elevation points of said cell;
  (ii) using said center elevation point to produce four three-dimensional triangles, each three-dimensional triangle formed from said center elevation point and two adjacent corner elevation points forming a side of said cell;
  (iii) transforming and projecting a plurality of cells composed of said four three-dimensional triangles for display on a video display.

12. The method of claim 11, wherein at least one of said three-dimensional triangles is displayed such that at least one edge of said at least one of said three-dimensional triangles has a different appearance than a central portion of said at least one of said three-dimensional triangles.

13. The method of claim 11 wherein said compressed digital map database comprises a plurality of geographic blocks, each geographic block representing a geographic area, wherein a first geographic block may have a different resolution from a second geographich block.

14. A method for compressing a digital elevation database to produce a compressed digital map databse for displaying three-dimensional polygons comprising the computer implemented steps of:
a) providing a digital elevation database, said digital elevation database comprising elevation points arranged in an array of rows and columns;
b) producing a compressed digital map database by taking every mth row and every nth column of said digital elevation database, wherein m and n are greater than 1;
c) during program run-time performing the steps of:
  (i) determining a center elevation point in the center of each cell of said compressed digital map database, whereby each said cell comprises four corner elevation points formed by the intersections of rows and columns of said compressed digital map database, and whereby said center elevation point is calculated by the steps of:
    (a) calculating the elveations of the extrapolated extends cell diagnols:
  (i) ZC1=Z(x,y+1)+(Z(x,y+1)−Z(x−1,y+2))*0.5;
  (ii) ZC2=Z(x+1,y+1) +(Z(x+1,y+1)−Z(x+1,y+2))*0.5;
  (iii) ZC3=Z(x+1,y)+(Z(x+1,y)−Z(x+2,y−1))*0.5;
  (iv) ZC4=Z(x,y)+(Z(x,y)−Z(x−1,y−1))*0.5;
    (b) taking the average value of ZC1, ZC2, ZC3, and ZC4;
  (ii) using said center elevatoin point to produce four three-dimensional triangles, each three-dimensional triangle formed from said center elevation point and two adjacent corner elevation points forming a side of said cell;
  (iii) transforming and projecting a plurality of cells composed of said four three-dimensional triangles for displaying on a video display.

15. The method of claim 14 wherein at least one of said three-dimensional triangles is displayed such that at least one edge of said at least one of said three-dimensional triangles has a different appearance than a central portion of said at least one of said three-dimensional triangles.

16. The method of claim 14 wherein said compressed digital map database comprises a plurality of geographic blocks, each geographic block representing a geographic area, wherein a first geographic block may have a different resolution from a second geographic block.

* * * * *

UNITED STATES PATENT AND TRADEMARK OFFICE
CERTIFICATE OF CORRECTION

PATENT NO. : 6,177,943 B1
DATED : January 23, 2001
INVENTOR(S) : Jed Margolin

It is certified that error appears in the above-identified patent and that said Letters Patent is hereby corrected as shown below:

Column 10,
Line 23, replace "database," with --database;--.
Lines 24-35, delete the text in its entirety.
Lines 44-53, replace claims 2 and 3 with the following claims:
    2. The method of claim 1 wherein said center elevation point
    is determined by taking the average elevation of said four corner
    elevation points of said cell.

3. The method of claim 1 wherein said center elevation point is
    determined by taking the highest elevation of said four corner
    elevation points of said cell.
Line 57, replace "elevation" wih --elevation--.
Line 59, replace "extrapolaed" with --extrapolated--
Line 60, replace "point is determined by performing the steps of:" with
--cell diagonals:--.

Column 11,
Line 37, replace "comprising a digital elevatoin" with --compressing
a digital elevation--.
Line 47, replace "during program run-time" with --c) during program run-time--.
Line 48, replace "elevatoin" with --elevation--.
Line 49, replace "each of cell" with --each cell--.

Column 12,
Line 13, replace "second geographich" with --second geographic--.
Line 15, replace "databse" with --database--.
Line 26, replace "determing" with --determining--.
Line 34, replace "calculating the elveatoins" with --calculating the elevations--.

UNITED STATES PATENT AND TRADEMARK OFFICE
CERTIFICATE OF CORRECTION

PATENT NO.    : 6,177,943 B1
DATED         : January 23, 2001
INVENTOR(S)   : Jed Margolin It is certified that error appears in the above-identified patent and that said Letters Patent is hereby corrected as shown below:

<u>Column 12, contd.</u>
Line 35, replace "extends cell diagnols" with --extended cell diagonals--.
Line 41, replace "center elevatoin point" with --center elevation point--.
Line 49, replace "for displaying" with --for display--.

Signed and Sealed this

Third Day of July, 2001

*Nicholas P. Godici*

Attest:

NICHOLAS P. GODICI
*Attesting Officer*   *Acting Director of the United States Patent and Trademark Office*